April 9, 1946.  A. A. McCOY ET AL  2,398,320
DEVICE FOR SEPARATING IMPROPERLY ORIENTED ARTICLES
Filed June 16, 1943
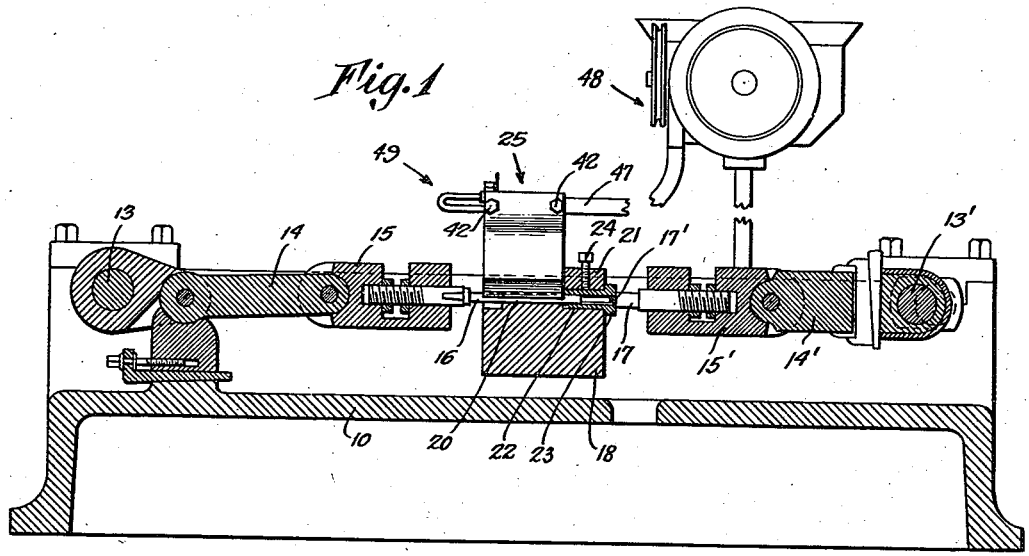
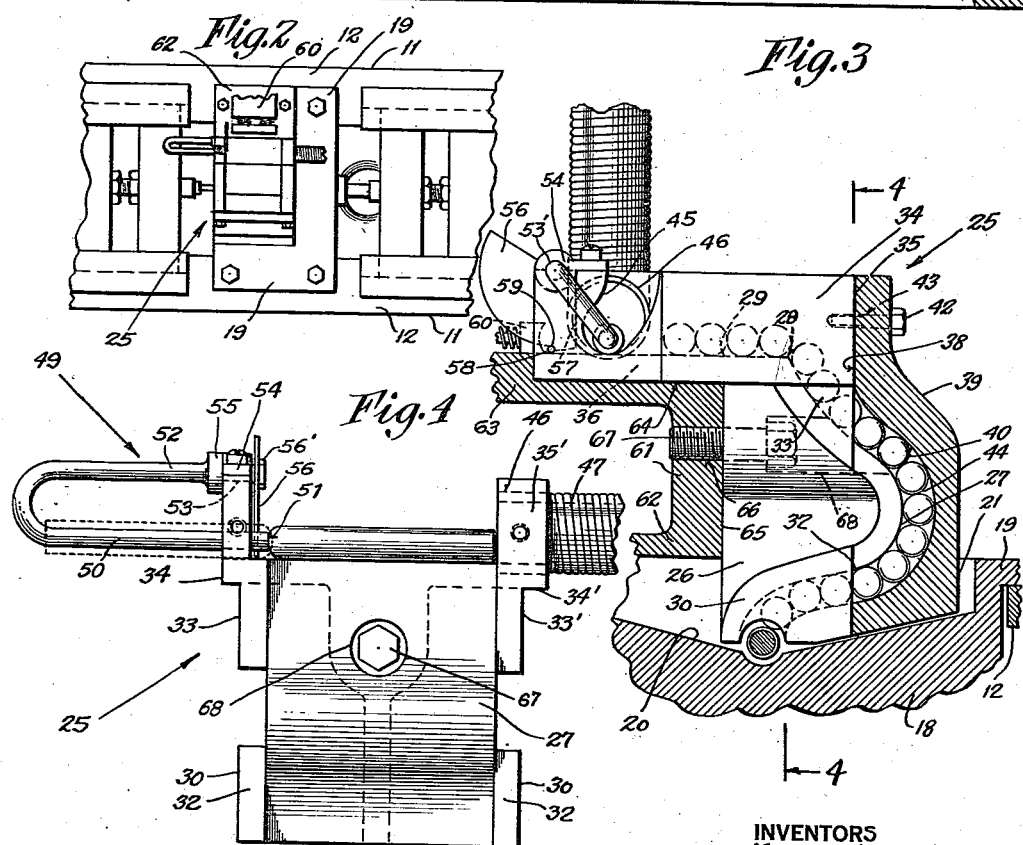
INVENTORS
Abram A. McCoy
Gustave L. Neumann
BY
Harold L. Gammons
AGENT Patented Apr. 9, 1946

2,398,320

UNITED STATES PATENT OFFICE 2,398,320

DEVICE FOR SEPARATING IMPROPERLY ORIENTED ARTICLES

Abram A. McCoy, Boulder, and Gustave L. Neumann, Denver, Colo., assignors to Remington Arms Company, Inc., Bridgeport, Conn., a corporation of Delaware Application June 16, 1943, Serial No. 490,988

4 Claims. (Cl. 209—72)

This invention relates, in general, to article separating means, and, in particular, to apparatus for enabling the removal of improperly oriented articles and ferrules from an article feeding and delivering means.

A particular article feeding and delivering means chosen to exemplify one embodiment of the invention and illustrated in the drawing is one type of automatic hopper feed which is used extensively in the manufacture of ammunition components for feeding cartridge cases or bullet jackets in substantially all stages of manufacture to machines for forming or shaping the components.

Typical of such component shaping machines is one adapted to perform the operations known as swaging or bumping, wherein the dome-shaped end of a case is flattened. The cartridge case is first telescoped onto the end of a mandrel and advanced thereby into a fixed die. While held firmly in the die by the mandrel, a suitable bunter or swaging tool is driven hard against the outer wall of the dome-shaped end of the case thereby flattening or swaging the head of the case against the end of the mandrel. At the moment of impact, the mandrel and bunter tools are kept apart only by the thickness of metal forming the head of the case. It follows then that if, during the continuous operation of the machine, a case is not delivered from the feed magazine onto the end of the mandrel, the tools will strike each other with the result that either or both the mandrel or bunter will be chipped or broken.

This contingency is not, however, limited to swaging or bumping machines, but exists also in the machines which perform the pocketing and heading operations on the swaged case; moreover, in the pocketing and heading machines, the tools used have profiles which are ground and polished with great accuracy, and hence are extremely expensive. The destruction of these tools is not only prohibitive from a cost standpoint but also from a standpoint of lost time required to repair and adjust the new tools.

The most common cause of tool smash-ups in pocketing machines has been the failure of the feeding devices to continuously supply properly oriented cases to the reciprocating mandrel. Some attempts have been made to overcome this failure by providing means which detect an inverted case and thereupon withhold its transfer to the mandrel. However, in so doing, all succeeding cases have been held up, and, unless the machine is constantly attended, the supply of cases to the mandrel is soon exhausted whereupon the mandrel and pocketing or swaging tool collide.

To obviate the occurrence of smashed tools due to interruptions in the flow of cases to the tools, many plants have resorted to manual feed and supervision. It will be evident, however, that a dependable automatic feed means which would continuously supply the cases to the mandrel in a properly oriented position would be preferable to hand feeding.

An object of the present invention is to automatically detect improperly oriented articles and to direct such articles from a feed magazine. A further object is to provide a cartridge case feeding magazine with means for automatically withdrawing inverted cases from the feed track to the magazine and enabling the unretarded passage of properly oriented cases.

Other objects, features and advantages of the invention will be more specifically described in the following specification.

In the drawing:

Fig. 1 is a diagrammatic side elevation partly in section of a cartridge case heading and pocketing machine equipped with the inverted case detecting and removing means of this invention.

Fig. 2 is a fragmentary plan view of the detecting means shown in Fig. 1.

Fig. 3 is a side elevation partly in section of the unit comprising the cartridge magazine and inverted case detecting and removing means.

Fig. 4 is a front elevation on line 4—4 of Fig. 3.

Referring to the drawing, the heading and pocketing machine shown in Fig. 1 comprises a channel-shaped base 10 having vertical side walls 11 provided with ways 12 on their upper edges. Suitably journaled at each end of the base are rotating crank shafts 13, 13' driven by suitable means, not shown, and connected by pitmans 14, 14' to reciprocating heads or gates 15, 15' slidingly supported on the ways 12. The head 15 is shown provided with an appropriate tool, in this instance a mandrel 16, fixedly secured in the head of an outside diameter comparable to the inside diameter of a cartridge case. The head or gate 15' is shown equipped with a pocketing tool 17 which comprises a stem having a relatively small concentric teat 17' projecting from the end thereof. The teat may be an integral part of the stem or a separate element suitably secured thereto and comprises an accurately shaped highly polished round nose stud having substantially the prescribed dimensions of the primer pocket in the cartridge case head.

The mandrel 16 and the pocketing punch 17 are reciprocated by their respective heads 15, 15' in axial alignment and longitudinally of the base 10.

Fixedly secured to the walls 11 of the machine between the heads 15, 15' is a die supporting member 18 comprising a substantially rectangular block having laterally extending flanges 19, see Figs. 2 and 3, adapted to be bolted to the ways 12. The upper surface of the block comprises a V-shaped trough 20 and a transverse die holding web 21 which, as shown in Fig. 1, is provided with an aperture or drilled hole 22 in axial alignment with the mandrel 16 and pocketing punch 17 for supporting a suitable die 23. The latter is held in the hole 22 by means of a set screw or bolt 24 fixedly secured in the web 21 of the supporting member 18.

The structure thus far described exemplifies a well known type of cartridge case pocketing machine adapted to illustrate the present invention but forms no part thereof; moreover, it will be understood that the present invention is not limited thereby.

The cartridge case magazine and inverted case detecting and removing device of this invention is indicated in general by the unit 25.

The magazine comprises a substantially rectangular casting or block 26, the front wall or face of which is formed with a sinuous surface 27, see Figs. 3 and 4, the upper end of which terminates in a lip 28 of a table top or platform 29 which constitutes the top of the block 26.

Suitably formed on the opposite sides of the block at its lower end are a pair of side plates 30, the front vertical edges of which form shoulders 32 which extend forwardly beyond the lower end of the sinuous surface 27. Formed at the upper end of the block 26 and on opposite sides thereof are a second pair of somewhat similar plates 33, 33'.

As shown, the plates 33, 33' constitute the lower extremities of vertical laterally offset walls 34, 34', the vertical edges 35, 35' of which form shoulders in the vertical plane of the shoulders 32. The walls 34, 34' extend rearwardly of the rear wall of the block 26 and are connected by an integrally formed rectangular shelf 36, the upper surface of which lies in the horizontal plane of the table top 29 of the block 26 and forms, in effect, an extension of the table top.

The shoulders 32 of the lower plates 30 and the shoulders 35, 35' of the upper wall members 34, 34' constitute abutments adapted to be engaged by the vertical edges 38 of a cover plate 39 which is suitably secured to the wall members 34, 34' by bolts 42, see Fig. 1, which pass through drilled holes 43 in the upper end of the cover at each side thereof and are threadedly secured in suitable holes in the shoulders 35, 35'. The cover plate is provided with a sinuous surface 40 complementing the sinuous surface 27 of the block 26, but spaced therefrom uniformly at a distance slightly greater than the outside diameter of a cartridge case. In their assembled relationship, the sinuous surface 27 of the block 26 and the sinuous surface 40 of the cover plate 39 thus form a magazine comprising a sinuous closed passage 44.

Suitably formed vertically in the left hand offset wall 34, as seen in Figs. 3 and 4, is an arcuate slot or aperture 45 located adjacent the rear of the platform 29. The lower arcuate closed end of the slot is substantially in axial alignment with a hole 46 drilled horizontally in the opposite right hand offset wall 34' of the platform while the upper end of the slot intersects the upper edge of the wall 34. The width of the slot 45 is sufficient to enable the passage therethrough of a cartridge case, the lowermost point on the periphery of the closed end of the slot being in tangential contact with the surface of the table top.

The hole 46 of the wall 34' is of such diameter as to receive the lower end 47 of a well known type of flexible feed tube, the latter being connected at its upper end to an automatic feed hopper, indicated generally at 48. The location of the hole 46 in the wall 34' is such that the inside wall of the lower end of the feed tube is supported substantially flush with the upper surface of the table top. A paddle wheel type of hopper is shown in the drawing, but it will be understood that a pin-wheel hopper or a hopper of any other suitable type may be used.

Suitable means for detecting and removing inverted cases which have been fed onto the table 29 of the magazine from the feed tube 47 is indicated generally at 49 and comprises a U-shaped wire member, one arm 50 of which extends into and through the slot 45 of the wall 34, the length of the arm being such that its end 51 is at a predetermined distance from the opposite side or wall 34' of the table, which distance is slightly greater than the length of a normal cartridge case.

The arm 50 is shown supported in the slot 45 by means of the second arm 52 of the U-shaped member, the arm 52 being rotatably mounted in the wall 34. To this end, a semicylindrical slot 53 is formed in the upper edge of the wall 34 to provide a bearing for the end of the arm 52, the latter being held in the bearing slot 53 by the complementary bearing surface 53' of a bracket 54 which is shown bolted to the upper edge of the side 34. A collar 55 is provided on the arm 52 spaced from the end thereof, as shown, and welded thereto so as to form a shoulder which abuts the outer face of the wall 34 to prevent displacement of the U-shaped wire member to the right, as seen in Fig. 4.

Suitable means are provided at the extreme end of the arm 52 for closing the slot or aperture 45 whenever the arm 50 of the U-shaped wire is displaced from its normal position, the normal position of the arm or wire 50 being that position in which the end 51 of the wire is opposite the mouth of and in longitudinal alignment with the feed tube, and comprises a substantially quadrant shaped target plate 56 welded to the end of the arm 52, as at 56', in closely spaced parallel relationship to the inner side of the wall 34. In the normal position of the arm 50, the forward edge 57 of the quadrant uncovers the slot 45, but, whenever the arm 50 is displaced from its normal position which is accomplished by rotating the arm 52 counterclockwise in its bearing, the target plate 55 swings across the slot 45 so as to cover it for the purpose hereinafter described. The arm 50 is effectively held in its normal position in the slot by suitable means comprising a pin 58 which is secured to the wall 34 and adapted to engage a notch 59 in the periphery of the quadrant when the latter is swung back into its retracted position.

The length and diameter of the arm 50 are suitably chosen so that when an improperly oriented or inverted case is fed across the table from the feed tube 47, its open end will slide freely over the end 51 of the arm and thereafter the force exerted against the rear or closed end of the inverted case by the column of cases in the feed tube 47 will be sufficient to push the inverted case its full length onto the arm 50. The inverted case is thus directed and removed from the path of the succeeding cases being fed from the tube 47 so that these cases are not blocked from movement into the magazine 44. Those cases which are properly oriented, that is to say, which are fed onto the table closed end first, are stopped by the end 51 of arm 50 and thereafter positively fed or pushed forward in a path at substantially right angles to the feed tube 47 over the lip 28 of the table into the mouth of the magazine 44.

Suitable means for positively feeding the cases along the table into the magazine 44 from their position on the table in engagement with the end 51 of the arm 50 may comprise the usual type of resilient pushing device, an exemplary embodiment of which is indicated generally at 60 in Figs. 2 and 3.

The unit 25 is adapted to be supported in the machine so that the lower end of the magazine 44 will be positioned immediately above the center of the V-shaped surface 20 and in longitudinal alignment with the mandrel 16 and die 23.

Suitable supporting means for the unit may comprise, as shown, a horizontally disposed U-shaped bracket 61, the lower leg 62 of which is bolted to a flange 19 of the bracket 18, as shown in Fig. 2. The upper leg 63 of the bracket is finished on its upper surface to slidably support the aforementioned pusher 60. In addition, a rectangular notch 64 is formed in its forward edge to provide a seat for the shelf portion 36 of the table.

The vertical face 65 of the bracket is provided with a threaded hole 66 which is adapted to accommodate the threaded end of a headed bolt 67 which is engaged in a counterbored hole 68 in the block 26 of the unit 25. By turning up the bolt 67, the unit 25 may be drawn tightly against the bracket 61 and thus fixedly held in position.

As pointed out above, the essential requirement of any automatic feed means for heading and pocketing machines is a constant and uninterrupted flow of properly oriented cases to the reciprocating mandrel and punch.

In accordance with the present invention, as cases are fed from the hopper 48 by the feed tube 47 onto the table 29, each case is pushed across the table into engagement with the end 51 of the detecting and removing wire 50. If a case is properly oriented, its closed end strikes the end 51 of the wire so that further movement of the case in this direction is stopped. Thereafter the pusher device 60 advances the case along the table in a direction at right angles to the feed tube over the lip 28 into the magazine 44 from which the case is automatically fed to the reciprocating mandrel 16. When, however, a case is delivered onto the table open end first, its open end telescopes onto the end 51 of the wire 50, and, as the succeeding cases in the feed urge the inverted case forward, it slides its full length onto the wire 50, as indicated by the dotted line position of the case in Fig. 4. It will be evident, therefore, that in this manner the inverted case is effectively directed and removed from the path of the succeeding cases.

Whenever an attendant discovers the inverted case on the wire 50, he is enabled to remove the case simply by grasping the arm 50 or the case thereon and swinging the arm upwardly in its slot 45 until the end 51 of the arm is above the upper edge of the wall 34, whereupon the inverted case may be readily drawn off of the end of the arm 50. Moreover, as the arm 50 is swung upwardly, the target plate 56 is moved over the slot 45 and covers it so that as the next succeeding case is projected out of the feed tube 47 across the table, it strikes the target plate, and, consequently, its movement in this direction is stopped. The case will then be engaged by the pusher 60 and fed into the magazine 25 in the usual manner so that the continuous flow of cases from the feed tube to the magazine thus continues uninterruptedly.

By equipping cartridge case pocketing, heading and swaging machines with the inverted case removing means of this invention, manual feeding and constant supervision of the machines may be eliminated and a positive uninterrupted flow of properly oriented cases to the tools insured.

What is claimed is:

1. In a device for feeding tubular articles having an open end and a closed end to article forming means, the combination with a feed tube; of a magazine having an aperture adjacent the discharged end of said tube, said magazine being adapted to receive articles being delivered from said feed tube closed end first and to deliver said articles to said forming means; a wire on said magazine opposite said aperture extending longitudinally in the path of articles being discharged from said feed tube for engaging the closed end of an article to direct the path of such article into said magazine and for engaging the open end of an article when said open end is foremost to direct such article from said magazine into said aperture, said wire being displaceable with respect to said aperture to remove an article therefrom; and means carried by said wire to cover said aperture when said wire is displaced.

2. A device for separating cartridge cases comprising feeding means; a magazine having an aperture in axial alignment with the discharge port of said feeding means, said magazine being adapted to receive cases which are discharged closed end first from said port; a wire in said aperture in the path of cases being discharged from said port having a portion adapted to engage in the open end of an inverted case being fed to said magazine to conduct such article into said aperture, said wire being displaceable from said aperture to remove a case therefrom; and means actuated simultaneously by displacement of said wire to cover said aperture to prevent the escape of cases from said magazine.

3. An article feeding and separating device for articles having an open end and a closed end comprising a feed chute; a magazine adjacent the lower end of said chute, said magazine comprising a table for receiving articles discharged from said chute; feed means constructed and arranged to engage an article on said table and move the article across said table in a path at substantially right angles to the path of discharge from said chute; an article separating wire mounted on said magazine normally in axial alignment with the path of articles being discharged from said chute and constituting an unsupported portion of greater length than the length of an article and of less diameter such that an article delivered open end first onto said table will telescope freely onto said wire and thereby automatically move entirely off of said table out of the path of said feed means and the succeeding articles being delivered onto said table; stop means on said table; and means carried by said wire adapted normally to engage said stop means to hold said wire in axial alignment with the articles being delivered from said chute.

4. An article feeding and separating device for articles having an open end and a closed end comprising a feed chute; a magazine adjacent the lower end of said chute for receiving articles discharged therefrom; a U-shaped wire pivotally mounted by one leg on said magazine, the second leg of said U-shaped wire extending normally in axial alignment with the path of articles being discharged from said chute to enable an article being delivered open end first to telescope onto said second leg and thereby to be removed from said magazine, said second leg being adapted to constitute a relatively fixed stop to be engaged by articles being discharged closed end first from said chute to retain such articles in said magazine, said second leg being displaceable out of alignment with said chute for removing the telescoped article therefrom; and a target plate carried on the first leg of said U-shaped wire and adapted to be moved into the path of articles being discharged from said chute, when said first leg has been displaced from its normal position for removal of a telescoped article therefrom, to retain articles in said magazine.

ABRAM A. McCOY.
GUSTAVE L. NEUMANN.